US008981907B1

(12) United States Patent
Lavache

(10) Patent No.: US 8,981,907 B1
(45) Date of Patent: Mar. 17, 2015

(54) RFID ANTENNA MULTIPLEXING

(71) Applicant: Disney Enterprises, Inc., Burbank, CA (US)

(72) Inventor: Steven David Lavache, Hertfordshire (GB)

(73) Assignee: Disney Enterprises, Inc., Burbank, CA (US)

(*) Notice: Subject to any disclaimer, the term of this patent is extended or adjusted under 35 U.S.C. 154(b) by 87 days.

(21) Appl. No.: 13/651,721

(22) Filed: Oct. 15, 2012

Related U.S. Application Data

(60) Provisional application No. 61/673,402, filed on Jul. 19, 2012.

(51) Int. Cl.
*H04Q 5/22* (2006.01)

(52) U.S. Cl.
USPC ..... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 235/375; 235/376; 235/377; 235/378; 235/379; 235/380; 235/381; 235/382; 235/382.5; 235/383; 235/384; 235/385

(58) Field of Classification Search
USPC ......................... 340/10.1–10.6, 572.1–572.9; 235/375–385
See application file for complete search history.

(56) References Cited

U.S. PATENT DOCUMENTS 4,831,331 A * 5/1989 De et al. ........................ 324/338
4,956,643 A * 9/1990 Hahn et al. ...................... 342/51
6,259,413 B1 * 7/2001 Schmidt et al. ............... 343/742
6,472,947 B1 * 10/2002 Zeitz ........................... 333/17.1
6,903,656 B1 * 6/2005 Lee ........................... 340/572.1
6,914,570 B2 * 7/2005 Asrani et al. .................. 343/702
7,265,731 B2 * 9/2007 Vance et al. .................. 343/860
7,474,156 B2 * 1/2009 Fujii ............................ 330/295
7,501,912 B2 * 3/2009 Jamneala et al. ............. 333/132
7,548,140 B2 * 6/2009 Jamneala et al. ............. 333/189
8,115,638 B2 * 2/2012 Sakama ..................... 340/572.7
8,313,028 B2 * 11/2012 Itay et al. ...................... 235/440
8,416,024 B2 * 4/2013 Fujii ............................ 330/302
2005/0099343 A1 * 5/2005 Asrani et al. .................. 343/702
2005/0125093 A1 * 6/2005 Kikuchi et al. ............... 700/213
2006/0139211 A1 * 6/2006 Vance et al. ........... 343/700 MS
2007/0008140 A1 * 1/2007 Saarisalo et al. ........... 340/572.7
2007/0118335 A1 * 5/2007 Andarawis et al. ........... 702/188
2008/0042778 A1 * 2/2008 Jamneala et al. ............. 333/133
2008/0079650 A1 * 4/2008 Constantinidis et al. ..... 343/858
2008/0186140 A1 * 8/2008 Kuwako et al. .............. 340/10.1
2008/0224826 A1 * 9/2008 Kuwako et al. .............. 340/10.1
2008/0252398 A1 * 10/2008 Jamneala et al. ............. 333/189
2008/0290948 A1 * 11/2008 Fujii ............................ 330/295
2009/0033467 A1 * 2/2009 Finocchiaro et al. ........ 340/10.1
2011/0198398 A1 * 8/2011 Itay et al. ...................... 235/439
2012/0182084 A1 * 7/2012 Peng et al. .................... 333/100
2012/0268210 A1 * 10/2012 Fujii ............................ 330/277
2014/0197991 A1 7/2014 Mkrtchyan et al. ........... 342/464

* cited by examiner

*Primary Examiner* — George Bugg
*Assistant Examiner* — Paul Obiniyi
(74) *Attorney, Agent, or Firm* — Pillsbury Winthrop Shaw Pittman LLP

(57) ABSTRACT

A system to multiplex antennas for radio-frequency communication uses one or more antenna shorting circuits to selectively enable RF communication via one of a plurality of antenna matching networks. The system is cost-efficient compared to alternatives. The RF communication includes read and/or read/write communication with, e.g., radio-frequency identification (RFID) tags.

20 Claims, 5 Drawing Sheets

500

START

Establish Radio-frequency Communication By Controlling A First Antenna Matching Network And A Second Antenna Matching Network
502

Selectively Establish Electrical Coupling For Alternating Current Between The First Antenna Matching Network And A First Antenna
504

Selectively Establish Electrical Coupling For Alternating Current Between The Second Antenna Matching Network And A Second Antenna
506

Selectively Enabling Radio-frequency Communication Via The First Antenna Matching Network Or The Second Antenna Matching Network
508

END

RFID ANTENNA MULTIPLEXING

FIELD OF THE DISCLOSURE

The present invention relates generally to wireless communications, and more particularly, some embodiments relate to multiplexed communications with RFID devices using multiple antennas.

BACKGROUND

Radio-frequency identification (RFID) is based on wireless, non-contact, radio-frequency (RF) electromagnetic fields to transfer data from one device (e.g., a tag) to another device such as a reader. RFID chips or tags act as transponders and can receive a radio signal sent by the tag reader or interrogator, and can respond by transmitting its unique ID code back to the reader. When given unique codes (or a unique code for a class of goods), RFID tags can uniquely identify the item to which they are attached. Accordingly, RFID tags can be used for identification and tracking of goods using wireless proximity sensing.

Most RFID tags are powered by the radio signal from the reader. The radio signal from the reader induces a current in one or more coils within the RFID tag. This current can be used to power the tag. This current may power electronic circuitry of the tag. Because RFID tags may be small, lightweight, and low cost, they may be suitable for various functionalities and/or tasks, including but not limited to tracking items, collecting tolls automatically, providing machine readable items and/or documents, and/or other tasks. For example, RFID tags can be used to track location, shipment and delivery of items, livestock and other animals.

SUMMARY

One aspect of the disclosure relates to a system to multiplex antennas for radio-frequency communication. The system comprises a radio-frequency reader circuit configured to establish radio-frequency communication by controlling a first antenna matching network and a second antenna matching network, a first alternating-current shorting circuit configured to selectively establish electrical coupling for alternating current between the first antenna matching network and a first antenna, a second alternating-current shorting circuit configured to selectively establish electrical coupling for alternating current between the second antenna matching network and a second antenna, and a controller configured to control the first and second alternating-current shorting circuits to selectively enable radio-frequency communication via the first antenna matching network or the second matching network.

Another aspect of the disclosure related to a computer-implemented method for multiplexing antennas for radio-frequency communication. The method comprises establishing radio-frequency communication by controlling a first antenna matching network and a second antenna matching network; selectively establishing electrical coupling for alternating current between the first antenna matching network and a first antenna; selectively establishing electrical coupling for alternating current between the second antenna matching network and a second antenna; and selectively enabling radio-frequency communication via the first antenna matching network or the second antenna matching network.

DETAILED DESCRIPTION

The typical radio-frequency identification (RFID) system comprises, by way of non-limiting example, two parts: an RFID interrogator, and an RFID tag. The terms "RFID interrogator" and "RFID reader" may be used interchangeably. The RFID interrogator is a reader/writer circuit that transmits electromagnetic radio-frequency (RF) signals at a given frequency for detection by the RFID tag. "RF signals" may also be referred to as "alternating current signals" or "AC signals" herein. The transmitted signal is received, modulated, and transmitted by the RFID tag. The RFID interrogator receives the modulated signal from the RFID tag and deciphers the information encoded thereon. The RFID tag may be placed on or implanted within an item or object, e.g. to be tracked. The RFID tag may store information and/or the identity of the item on which it is placed.

Once the RFID tag comes into proximity of a signal at the right frequency, a current may be induced in one or more coils within the tag. The tag is in a sense activated. Logic (e.g. electronic circuitry) inside the tag modulates the signal and transmits the modulated signal. The transmitted modulated signal may be received by the interrogator. The modulated signal may represent a bit sequence, which includes desired information and/or the identity of the item.

Figure 1:
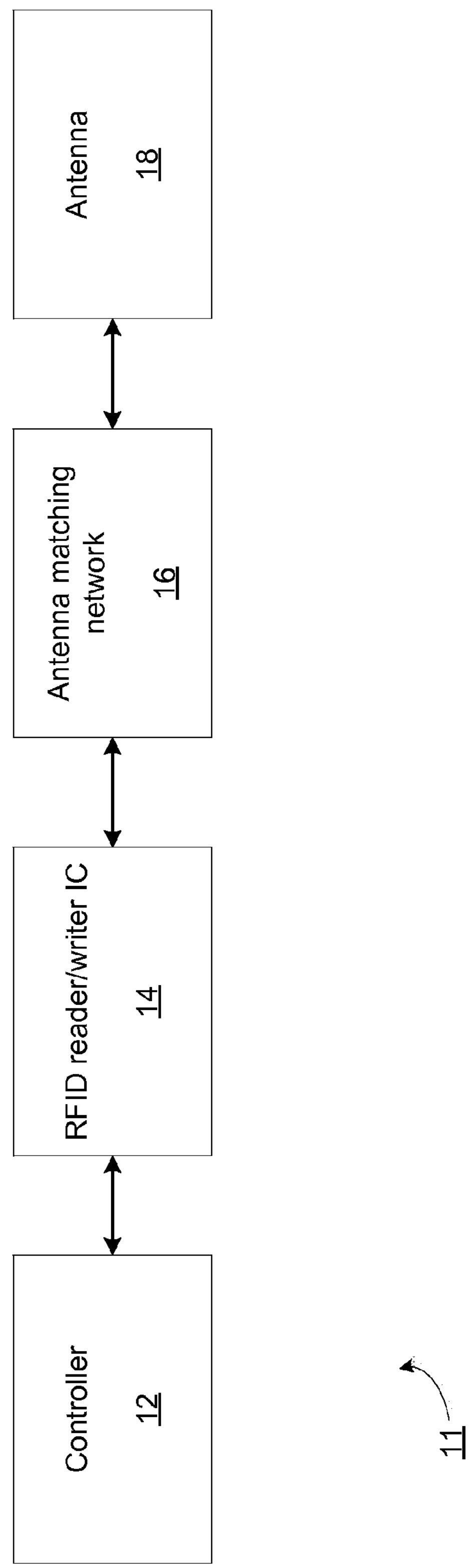
FIG. 1 illustrates an RFID interrogator.

FIG. 1 shows an RFID interrogator 11. RFID interrogator 11 may include a microcontroller unit (MCU) 12 and/or other controller 12, an RFID reader/writer IC 14, an antenna matching network 16, an antenna 18 for wireless communications, and/or other components. Controller 12 may be implemented using a general-purpose processor programmed to cause the system to perform functions described herein, including but not limited to generating an RF signal to interrogate one or more RFID tags, detect and receive modulated signals from one or more RFID tags, interpret the signal received from the RFID tags, and other functions appropriate to an RFID interrogator.

RFID reader/writer IC 14 may include transmit and receive circuitry to transmit signals to RFID tags (e.g. a transmitter) and to receive signals from the RFID tags (e.g. a receiver). An RFID reader/writer IC may be referred to as a radio-frequency reader circuit, and/or a radio-frequency reader-writer circuit, depending on the embodiment and/or functionality in context. RFID reader/writer IC 14 may include demodulation circuitry to demodulate a modulated RFID signal and detect or decipher the information modulated thereon. RFID reader/writer IC 14 may be configured to establish radio-frequency communication by controlling antenna matching network 16.

Antenna matching network 16 may be used to match antenna 18 to a transmitter within RFID reader/writer IC 14. Matching antenna 18 may improve and/or optimize transmission and/or reception using antenna 18. Matching may be based on electromagnetic properties of antenna 18. Matching may be accomplished by matching the input fields of antenna 18 to maximize or increase the power transfer or minimize reflections from antenna 18. Impedance matching to minimize reflections may be achieved by changing the effective load impedance so that it matches the impedance of the transmitter. Alternatively, and/or simultaneously, complex conjugate matching may be used to increase power transfer by adding a reactive component to the load that is opposite in sign of a reactive component of the source. The source may for example be antenna 18. This reactive component may include one or more capacitors and/or inductors. Matching may be used to find and/or use the resonant frequency of an antenna. In other words, by virtue of using antenna matching network 16 antenna 18 is driven at or near resonance.

Difficulties may arise when RFID interrogator 11 is intended to communicate with multiple RFID tags at once. For example, in some embodiments and/or applications, an RFID interrogator may be expected to communicate with multiple RFID tags. For example, automated grocery store checkout may use RFID tags to "scan" or process multiple items in a shopping cart in a brief span of time; tracking multiple medicine containers in the hospital pharmacy in a brief span of time; and tracking livestock, just to name a few. In the videogame industry the need to identify and track multiple RFID tags at the same time may arise. For example, a video game may use RFID tags to identify tokens and bases, and/or to associate possessions with the tokens. Accordingly, a player's token (indicating, for example, his or her identity) may include an RFID tag identifying that token. Game-related, and possibly virtual, possessions such as weapons, cash, or other resources may likewise be accumulated and identified by RFID tags. Accordingly, for a video game system to recognize a token in its various associated possessions, the video game system may need to be able to communicate with multiple RFID tags simultaneously or at least in rapid succession.

Figure 2:
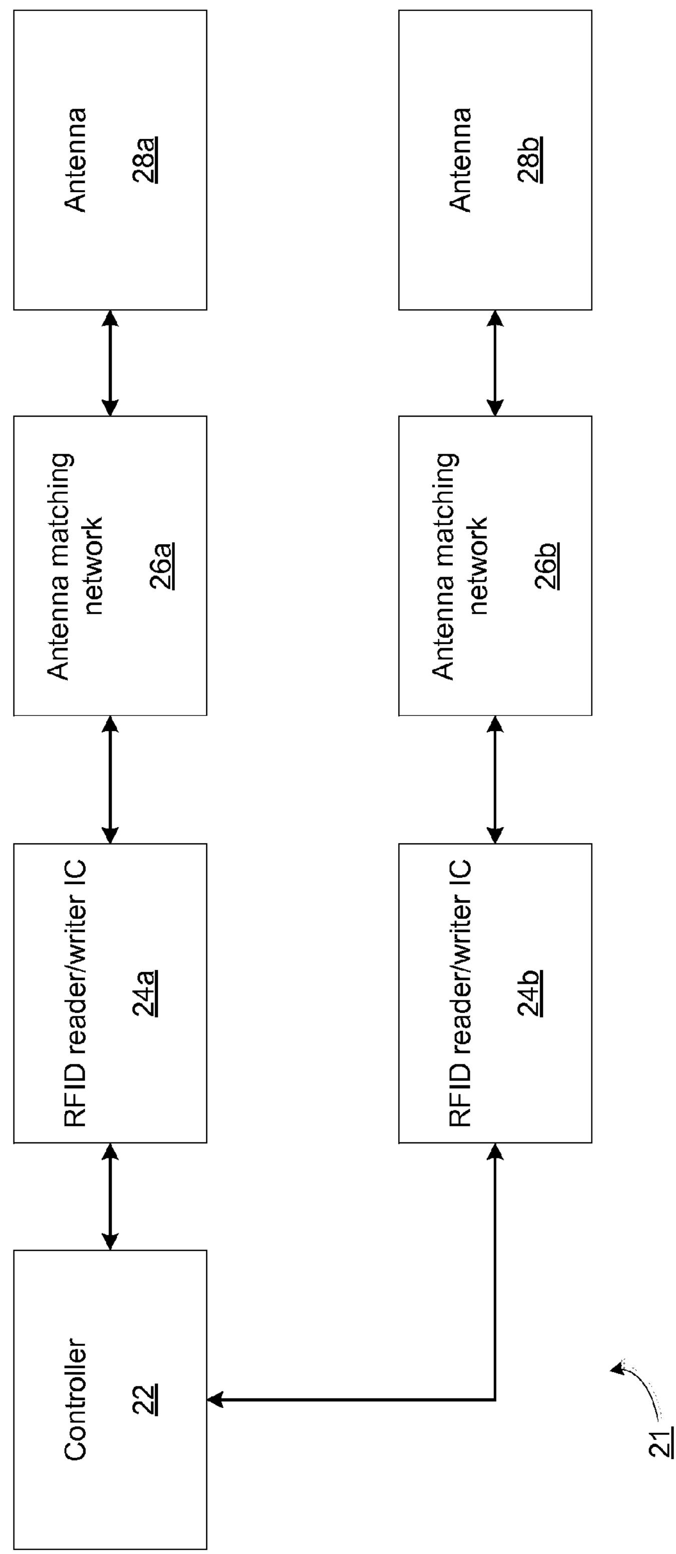
FIG. 2 illustrates a costly implementation of an RFID interrogator using two antennas.

If an RFID interrogator is intended to communicate with multiple different RFID tags at the same time multiple antennas, and therefore, multiple matching networks may be required. By way of illustration, FIG. 2 illustrates a common, but costly, implementation of an RFID interrogator 21 that allows communications with multiple RFID tags by the same interrogator. As depicted in FIG. 2, RFID interrogator 21 includes a controller 21, a first RFID reader/writer IC 24*a*, a second RFID reader/writer IC 24*b*, a first antenna matching network 26*a*, a second antenna matching network 26*b*, a first antenna 28*a*, a second antenna 28*b*, and/or other components. Because of the duplication of components in this design, it tends to be relatively costly. This is especially true as additional communication channels are added to communicate with additional RFID tags.

Note that controller 22 may have similar functionalities as controller 12 in FIG. 1. Note that first and second RFID reader/writer IC 24*a*-24*b* may have similar functionalities as RFID reader/writer IC 14 in FIG. 1. Note that first and second antenna matching network 26*a*-26*b* may have similar functionalities as antenna matching network 16 in FIG. 1. Note that first and second antenna 28*a*-28*b* may have similar functionalities as antenna 18 in FIG. 1.

Figure 3:
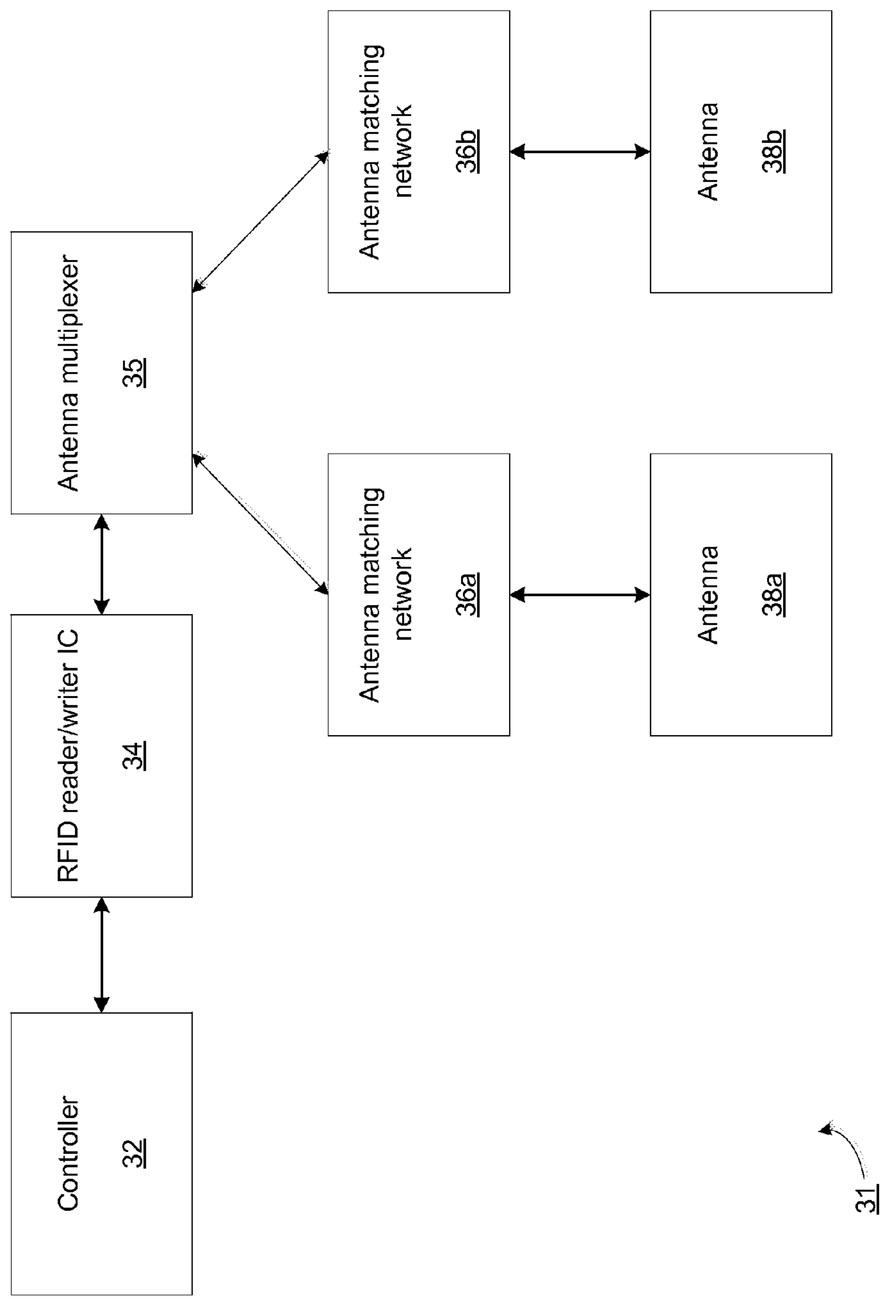
FIG. 3 illustrates a costly implementation of an RFID interrogator using two antennas.

Returning to FIG. 2, one attempt to avoid duplication of the reader/writer IC is to provide an antenna multiplexer 35 to communicate with multiple antennas (as depicted: first antenna 38*a* and second antenna 38*b*). By way of illustration, FIG. 3 depicts an RFID interrogator 31 that avoids duplication of a reader/writer IC 34 through the use of antenna multiplexer 35. RFID interrogator 31 includes a controller 32, an RFID reader/writer IC 34, antenna multiplexer 35, a first antenna matching network 36*a*, a second antenna matching network 36*b*, a first antenna 38*a*, a second antenna 38*b*, and/or other components. The inclusion of antenna multiplexer 35 typically impacts the complexity of the antenna matching networks (as depicted: first antenna matching network 36*a* and second antenna matching network 36*b*). Accordingly, it is difficult to obtain sufficient performance from RFID interrogator 31 with the addition of antenna multiplexer 35 between reader/writer IC 34 and the antennas. The embodiment depicted in FIG. 3 may require a high degree of precision with both antenna matching networks, which may lead to greater costs and a less robust operation.

Note that controller 32 may have similar functionalities as controller 22 in FIG. 2. Note that RFID reader/writer IC 34 may have similar functionalities as RFID reader/writer IC 24*a* in FIG. 2. Note that first and second antenna matching network 36*a*-36*b* may have similar functionalities as first and second antenna matching network 26*a*-26*b* in FIG. 2. Note that first and second antenna 38*a*-38*b* may have similar functionalities as first and second antenna 28*a*-28*b* in FIG. 2.

To overcome and/or reduce the effects of antenna multiplexer 35, as described above, antenna shorting circuits may be provided for individual antennas in a multi-antenna RFID interrogator. When the RFID interrogator intends to communicate with an RFID tag on one of the multiple antennas, other antennas may be shorted by one or more shorting circuits. As a result or shorting, unwanted signals may be not transmitted (and/or at least not transmitted to the same extent or having the same energy) by the shorted antennas. The shorted antennas may cause no or reduced interference with a (non-shorted) antenna being used for communications.

A shorting circuit may include one or more of a switch, one or more radio-frequency (RF) relays, one or more capacitors, and/or other components. A shorting circuit may be configured to short alternating signals, e.g. alternating current. Shorting may not need to be perfect or complete. Shorting signals at the particular frequency of intended use may be sufficient. The shorting circuits may not need to short, e.g., direct current. In some embodiments, a shorting circuit may be considered a circuit that intentionally de-tunes the connection between an antenna matching network and an antenna. De-tuning may change the resonant frequency of the antenna matching network. De-tuning may cause the amplitude of the AC signal to be reduced. De-tuning may have the described effect of shorting. For example, RF relays may be used to provide an RF short. Alternatively and/or simultaneously, one or more RF relay switches may be used to switch one or more unwanted signals into dummy loads. Other switching mechanisms can be used to short one or more antennas.

Figure 4:
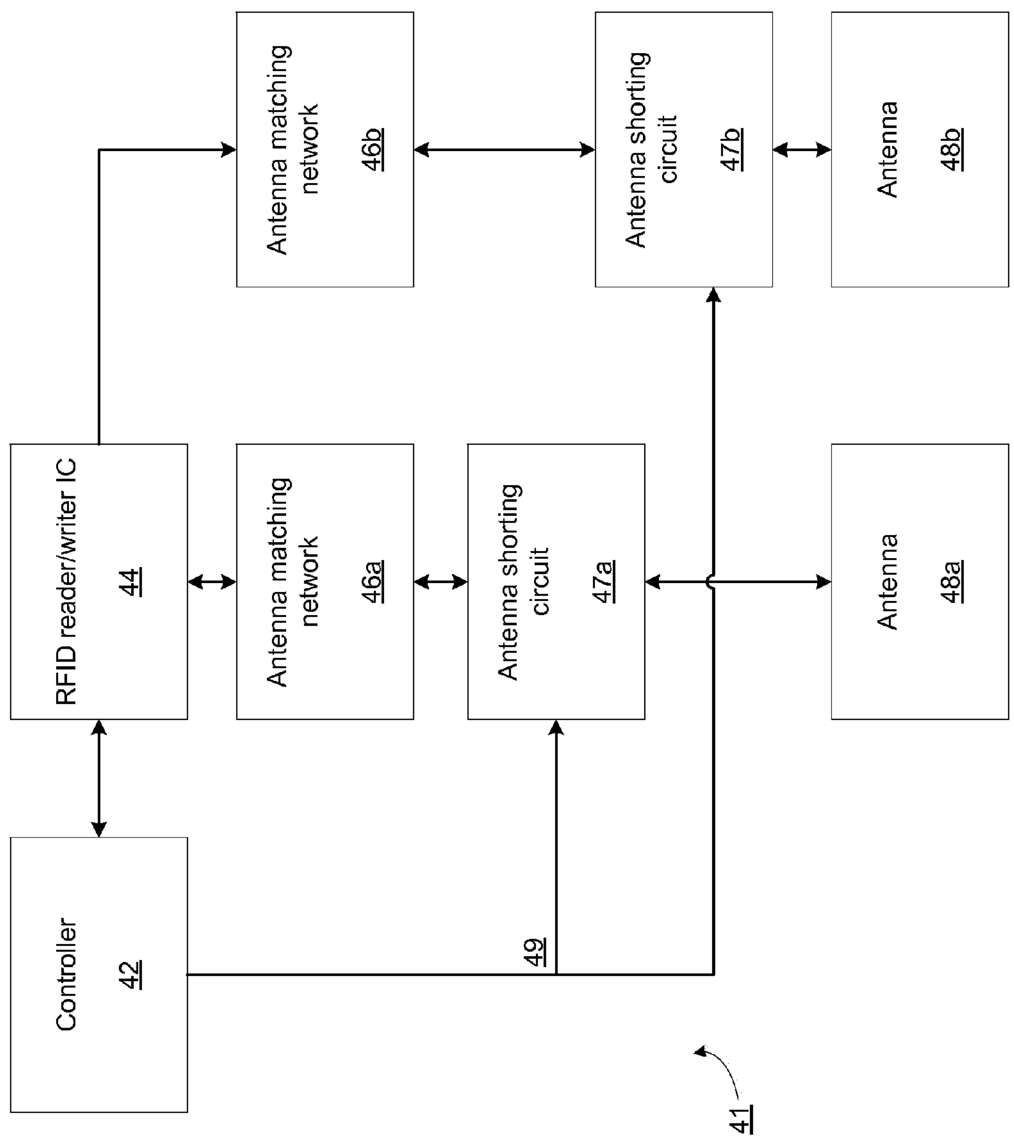
FIG. 4 illustrates an example of a system to multiplex antennas for RF communication in accordance with one or more embodiments.

FIG. 4 illustrates an exemplary implementation of an RFID interrogator 41 configured to communicate with multiple RFID tags in accordance with one embodiment of the systems and methods described herein. Although FIG. 4 is illustrated as multiplexing two antennas (as depicted: first antenna 48*a* and second antenna 48*b*) for communication with two RFID tags (not shown), this is not intended to be limiting in any way. By virtue of using one or more antenna shorting circuits, RFID interrogators may use three or more antennas and/or antenna matching networks. The number of shorting circuits, matching networks and antennas may not need to match.

Referring to FIG. 4, RFID interrogator 41 includes a controller 42 to control the operations of an RFID reader/writer IC 44 to communicate with multiple RFID tags (not shown), a first antenna matching network 46*a*, a second antenna matching network 46*b*, a first antenna shorting circuit 47*a*, a second antenna shorting circuit 47*b*, a first antenna 48*a*, a second antenna 48*b*, and/or other components. Controller 42 may be configured to control first antenna shorting circuit 47*a* and second antenna shorting circuit 47*b*, for example through a control signal 49. As illustrated in this example, because the unused antennas can be shorted to avoid (at least most of the) interference and other unwanted effects and/or problems, this embodiment can be implemented using a single controller 42 and a single RFID reader/writer IC 44. In some embodiments, multiple controllers and/or multiple RFID reader/writer IC's may be used.

Note that controller 42 may have similar functionalities as controller 32 in FIG. 3. Note that RFID reader/writer IC 44 may have similar functionalities as RFID reader/writer IC 34 in FIG. 3. Note that first and second antenna matching network 46*a*-46*b* may have similar functionalities and simplicity of construction and/or operation as first and second antenna matching network 26*a*-26*b* in FIG. 2. Note that first and second antenna 48*a*-48*b* may have similar functionalities as first and second antenna 38*a*-38*b* in FIG. 3.

Different antennas may have different themes, reactive properties, and/or electromagnetic characteristics. Separate matching networks may be provided for one or more antennas. However, because an antenna multiplexer (as shown in FIG. 3) is not included or needed in FIG. 4, relatively simple antenna matching networks may be used. The antenna matching networks depicted in FIG. 4 may not need to compensate for the effects of an antenna multiplexer.

RFID interrogator 41 may step or sweep through multiple antennas to communicate with multiple RFID tags. Stepping or sweeping may be performed one antenna at a time. Controller 42 may be programmed with a particular or predetermined sweep order in which to step through the antennas. Thus, communication with the various individual RFID tags may be established one by one. Controller 42 may be configured to control, in a coordinated fashion, RFID reader/writer IC 44 and/or antenna shorting circuits 47*a*-47*b* so that RFID interrogator 41 is communicating with the intended RFID tag through read operations and/or read/write operations, as appropriate for the type of RFID tag and the application.

In some embodiments having three or more antenna, multiple antennas may be shorted at the same time. When one or more antennas are shorted, an antenna that is intended for use in communicating with an RFID tag may not be shorted. In some embodiments, only one antenna is not shorted during communication with an RFID tag. As illustrated by control line 49 in FIG. 4, selectively shorting one or more antennas may be controlled by controller 42. For example, one or more RF relays may be controlled by the controller. Implementations may include signal lines on a bus, dedicated lines, and/or other techniques to implement control line 49.

In some embodiments (not depicted in FIG. 4), RFID reader/writer IC 44 may be used to control one or more antenna shorting circuits to short the appropriate antennas at the appropriate time. For example, RFID reader/writer IC 44 may control one or more control lines (or a bus, etc.) that control one or more antenna shorting circuits as described elsewhere.

Controller 42 may be configured to control RFID reader/writer IC 44. Controller 42 may be configured to control RFID reader/writer IC 44 to short elements or circuits within RFID interrogator 41 to effectively sweep through a plurality of antennas. By virtue of using one or more embodiments disclosed in this disclosure, RFID interrogator 41 may interrogate, identify, and/or obtain information from one or more RFID tags. Various scanning algorithms may be used to scan the one or more RFID tags and collect information therefrom. For example, controller 42 may control a one-by-one scanning of individual ones of the RFID tags in a designated set of RFID tags, e.g. scanning one at a time. As one antenna is brought online (its short removed), one or more other antennas may be shorted in a manner as described in this disclosure. Scanning may be accomplished in any of a number of scan patterns as may be appropriate for a given application.

An antenna may be shorted anywhere along the length of the antenna. In some embodiments, an antenna is shorted at its feed for ease of implementation. Other techniques may be used to change the electrical length of an antenna. Other techniques may be used to disrupt the resonance of an antenna. By virtue of using the techniques described herein, one or more particular antennas may selectively not interfere with one or more other antennas during communication.

The present invention, in accordance with one or more various embodiments, is described above in detail with reference to the accompanying figures. The drawings are provided for purposes of illustration only and merely depict exemplary embodiments. These drawings are provided to facilitate the reader's understanding of the systems and methods described herein and shall not be considered limiting of the breadth, scope, or applicability of any of the claims.

Although the systems and methods set forth herein are described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts, and/or other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Controller 42 may be configured to provide information processing capabilities in RFID interrogator 41. As such, controller 42 may include one or more of a digital processor, an analog processor, a digital circuit designed to process information, an analog circuit designed to process information, a state machine, and/or other mechanisms for electronically processing information. Although controller 42 is shown in FIG. 4 as a single entity, this is for illustrative purposes only. In some implementations, controller 42 may include a plurality of processing units. These processing units may be physically located within the same device, or controller 42 may represent processing functionality of a plurality of devices operating in coordination. Controller 42 may be configured to execute computer program modules. Controller 42 may be configured to execute computer program modules by software; hardware; firmware; some combination of software, hardware, and/or firmware; and/or other mechanisms for configuring processing capabilities on controller 42.

It should be appreciated that although the components of RFID interrogator 41 are illustrated in FIG. 4 as being co-located within a single unit, in some implementations one or more of the components may be located remotely from the other components. The description of the functionality provided by the different components described herein is for illustrative purposes, and is not intended to be limiting, as any of the components may provide more or less functionality than is described. For example, one or more of the components may be eliminated, and some or all of its functionality may be provided by other ones of the components.

Figure 5:
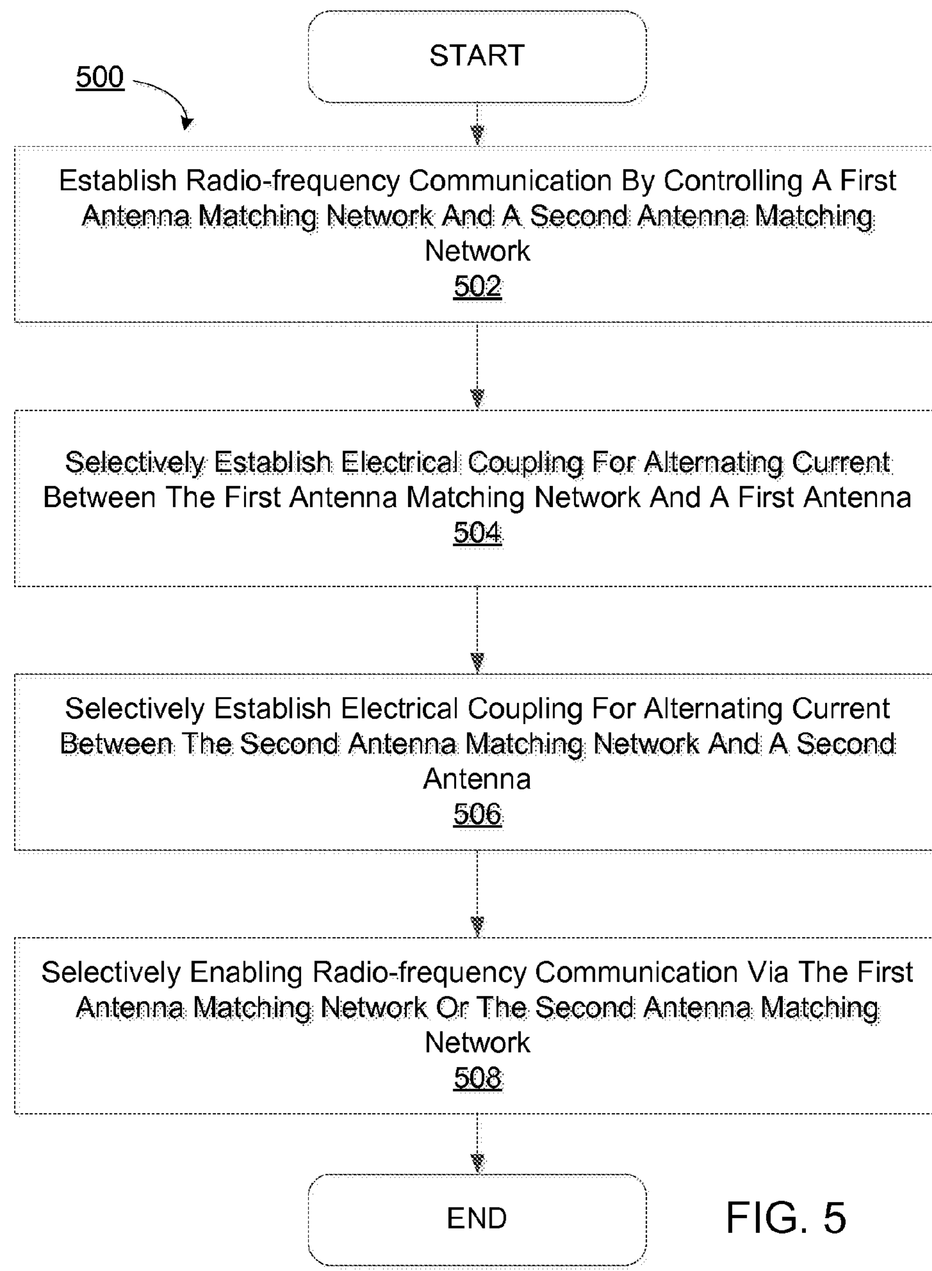
FIG. 5 illustrates a method for multiplexing antennas for RF communication in accordance with one or more embodiments.

FIG. 5 illustrates a method 500 for multiplexing antennas for radio-frequency communication, in accordance with one or more embodiments. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, radio-frequency communication is established by controlling a first antenna matching network and a second antenna matching network. In some embodiments, operation 502 is performed by a RFID reader/writer IC the same as or similar to RFID reader/writer IC 44 (shown in FIG. 4 and described herein).

At an operation 504, electrical coupling is selectively established for alternating current between the first antenna matching network and a first antenna. In some embodiments, operation 504 is performed by an antenna shorting circuit the same as or similar to antenna shorting circuit 47*a* (shown in FIG. 4 and described herein).

At an operation 506, electrical coupling is selectively established for alternating current between the second antenna matching network and a second antenna. In some embodiments, operation 506 is performed by an antenna shorting circuit the same as or similar to antenna shorting circuit 47*b* (shown in FIG. 4 and described herein).

At an operation 508, radio-frequency communication is selectively enabled via the first antenna matching network or the second antenna matching network. In some embodiments, operation 508 is performed by a controller the same as or similar to controller 42 (shown in FIG. 4 and described herein)

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to multiplex antennas for radio-frequency (RF) communication, the system comprising:

a radio-frequency (RF) reader circuit configured to establish radio-frequency communication by controlling a first antenna matching network and a second antenna matching network, wherein the first antenna matching network is configured to match a first antenna to a receiver and the second antenna matching network is configured to match a second antenna to the same receiver;

a first alternating-current shorting circuit configured to selectively establish electrical coupling for alternating current between the first antenna matching network and the first antenna;

a second alternating-current shorting circuit configured to selectively establish electrical coupling for alternating current between the second antenna matching network and the second antenna;

a controller configured to control the first and second alternating-current (AC) shorting circuits to operate selectively in one of the following states at a given time:

i) a first state wherein radio-frequency communication is established through the first antenna and electrical coupling for alternating current is shorted by the second alternating-current shorting circuit, ii) a second state wherein radio-frequency communication is established through the second antenna and electrical coupling for alternating current is shorted by the first alternating-current shorting circuit, or iii) a third state wherein electrical coupling for alternating current is shorted by the first alternating-current shorting circuit and electrical coupling for alternating current is shorted by the second alternating-current shorting circuit; and wherein the controller is further configured to cause operation of the first alternating-current shorting circuit and the second alternating-current shorting circuit in a predetermined order.

2. The system of claim 1, further comprising:

the first antenna;

the first antenna matching network configured to match electromagnetic properties of the first antenna;

the second antenna; and the second antenna matching network configured to match electromagnetic properties of the second antenna.

3. The system of claim 1, wherein the radio-frequency (RF) reader circuit is configured to establish radio-frequency communication through radio-frequency identification (RFID) with one or more radio-frequency identification (RFID) tags.

4. The system of claim 1, wherein the radio-frequency (RF) reader circuit controls the first antenna matching network and the second antenna matching network to establish radio-frequency communication through one antenna at a time.

5. The system of claim 1, wherein the radio-frequency (RF) reader circuit controls the first antenna matching network and the second antenna matching network to establish radio-frequency communication through one antenna matching network at a time.

6. The system of claim 1, wherein the first alternating-current shorting circuit is configured to selectively establish electrical coupling for alternating current between the first antenna matching network and the first antenna such that information is received from a first radio-frequency identification (RFID) tag through the first antenna.

7. The system of claim 1, wherein the controller is further configured to control the radio-frequency (RF) reader circuit to transfer information from the first antenna matching network to the controller.

8. The system of claim 1, further comprising a third alternating-current shorting circuit configured to selectively establish electrical coupling for alternating current between the third antenna matching network and a third antenna, the third antenna matching network configured to match the third antenna to the receiver, wherein the radio-frequency (RF) reader circuit is further configured to establish radio-frequency communication by controlling the third antenna matching network, and wherein the controller is further configured to control the first, second, and third alternating-current (AC) shorting circuits to operate selectively in one of the following states at a given time:

i) a first state wherein radio-frequency communication is established through the first antenna and electrical coupling for alternating current is shorted by the second and third alternating-current shorting circuits, ii) a second state wherein radio-frequency communication is established through the second antenna and electrical coupling for alternating current is shorted by the first and third alternating-current shorting circuits, iii) a third state wherein radio-frequency communication is established through the third antenna and electrical coupling for alternating current is shorted by the first and second alternating-current shorting circuits, or iv) a fourth state wherein electrical coupling for alternating current is shorted by the first, second, and third alternating-current shorting circuits; and wherein the controller is further configured to cause operation of the first alternating-current shorting circuit, the second alternating-current shorting circuit, and the third alternating-current shorting circuit in a predetermined order.

9. The system of claim 1, wherein the first alternating-current shorting circuit is configured to selectively establish electrical coupling for alternating current between the first antenna matching network and the first antenna such that electrical coupling is selectively shorted by virtue of disrupting resonance of the first antenna.

10. The system of claim 1, wherein the first alternating-current shorting circuit is configured to selectively establish electrical coupling for alternating current between the first antenna matching network and the first antenna such that electrical coupling is selectively shorted by virtue of detuning the first antenna.

11. A system to multiplex antennas for radio-frequency (RF) communication, the system comprising:

a radio-frequency (RF) reader-writer circuit configured to establish radio-frequency communication by controlling a first antenna matching network and a second antenna matching network, wherein the first antenna matching network is configured to match a first antenna to a transceiver and the second antenna matching network is configured to match a second antenna to the same transceiver;

a first alternating-current shorting circuit configured to selectively establish electrical coupling for alternating current between the first antenna matching network and the first antenna; and a second alternating-current shorting circuit configured to selectively establish electrical coupling for alternating current between the second antenna matching network and the second antenna, wherein the radio-frequency reader-writer circuit is further configured to control the first and second alternating-current (AC) shorting circuits to operate selectively in one of the following states at a given time:

i) a first state wherein radio-frequency communication is established through the first antenna and electrical coupling for alternating current is shorted by the second alternating-current shorting circuit, ii) a second state wherein radio-frequency communication is established through the second antenna and electrical coupling for alternating current is shorted by the first alternating-current shorting circuit, or iii) a third state wherein electrical coupling for alternating current is shorted by the first alternating-current shorting circuit and electrical coupling for alternating current is shorted by the second alternating-current shorting circuit; and wherein the controller is further configured to cause operation of the first alternating-current shorting circuit and the second alternating-current shorting circuit in a predetermined order.

12. The system of claim 11, further comprising:

the first antenna;

the first antenna matching network configured to match electromagnetic properties of the first antenna;

the second antenna; and the second antenna matching network configured to match electromagnetic properties of the second antenna.

13. The system of claim 11, wherein the radio-frequency (RF) reader-writer circuit is configured to establish two-way radio-frequency communication through radio-frequency identification (RFID) with one or more radio-frequency identification (RFID) tags.

14. The system of claim 11, wherein the radio-frequency (RF) reader-writer circuit controls the first antenna matching network and the second antenna matching network to establish radio-frequency communication through one antenna at a time.

15. A computer-implemented method for multiplexing antennas for radio-frequency (RF) communication, the method comprising:

establishing radio-frequency communication by controlling operations of a first antenna matching network and a second antenna matching network, wherein the first antenna matching network is configured to match a first antenna to a transceiver and the second antenna matching network is configured to match a second antenna to the same transceiver;

selectively establishing electrical coupling for alternating current between the first antenna matching network and the first antenna;

selectively establishing electrical coupling for alternating current between the second antenna matching network and the second antenna; and selectively enabling radio-frequency communication via the first antenna matching network or the second antenna matching network, such that the first and second antenna matching networks operate selectively in one of the following states at a given time:

i) a first state wherein radio-frequency communication is established through the first antenna matching network and electrical coupling for alternating current is shorted for the second antenna matching network, ii) a second state radio-frequency communication is established through the second antenna matching network and electrical coupling for alternating current is shorted for the first antenna matching network, or iii) a third state wherein electrical coupling for alternating current is shorted for the first and second antenna matching networks; and wherein the controlling of the operations of the first antenna matching network and the second antenna matching network is in a predetermined order.

16. The method of claim 15, further comprising:

matching electromagnetic properties of the first antenna; and matching electromagnetic properties of the second antenna.

17. The method of claim 15, wherein establishing radio-frequency communication is performed through radio-frequency identification (RFID) with one or more radio-frequency identification (RFID) tags.

18. The method of claim 15, wherein establishing radio-frequency communication is performed through one antenna at a time.

19. The method of claim 15, wherein selectively establishing electrical coupling for alternating current between the first antenna matching network and a first antenna is performed such that information is received from a first radio-frequency identification (RFID) tag through the first antenna.

20. The method of claim 15, wherein selectively establishing electrical coupling for alternating current between the second antenna matching network and a second antenna is performed such that information is received from a second radio-frequency identification (RFID) tag through the second antenna.

* * * * *